United States Patent

[11] 3,608,934

[72] Inventor Richard P. Yeates
   Bridgeton, Mo.
[21] Appl. No. 56,296
[22] Filed July 20, 1970
[45] Patented Sept. 28, 1971
[73] Assignee ACF Industries, Incorporated
   New York, N.Y.

[54] MANUAL LOCK FOR A TRAILER HITCH
   6 Claims, 12 Drawing Figs.
[52] U.S. Cl. ..................................... 287/20, 248/119
[51] Int. Cl. ..................................... F16b 9/02
[50] Field of Search ........................... 287/20, 20.5; 280/432, 437; 248/119 S; 105/368 S

[56] References Cited
   UNITED STATES PATENTS
   1,867,670  7/1932  Lubbers ............... 280/437
   2,258,432  10/1941  Winn ................. 280/432

Primary Examiner—David J. Williamowsky
Assistant Examiner—Andrew V. Kundrat
Attorneys—Eugene N. Riddle and Samuel J. Snyder ABSTRACT: A hitch, particularly of the tractor-operated type for supporting a trailer on a railway car, has a pair of jaws adapted to clamp the upper portion of a trailer kingpin, and an additional manual locking device for holding the kingpin in the trailer supporting plate of the hitch. The manual locking device includes a locking plate located beneath the kingpin and pivoted to the supporting plate and extending forwardly of the kingpin. The forward end of the locking plate has an upturned ridge or wall. A locking handle supported on the bottom of the supporting plate is adapted to slide forwardly to engage the bottom of the locking plate and move it upwardly. In this position the upstanding wall on the locking plate is juxtaposed to the lower portion of the kingpin to prevent it from moving out of the supporting plate.

PATENTED SEP28 1971

3,608,934

INVENTOR.
RICHARD P. YEATES
BY Samuel J. Snyder
ATTORNEY

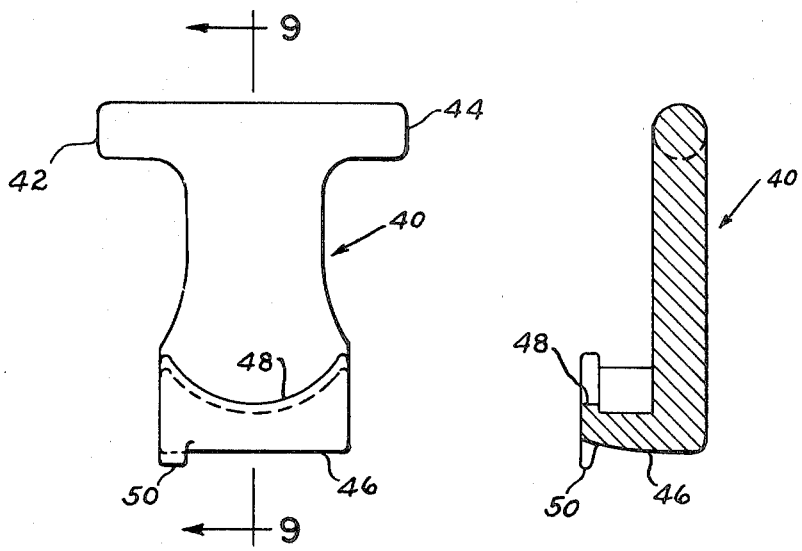
FIG. 8.
FIG. 9.
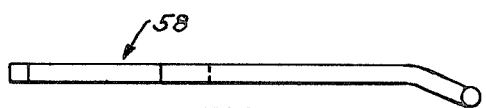
FIG. 11.
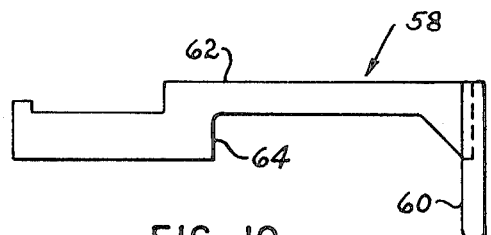
FIG. 10.
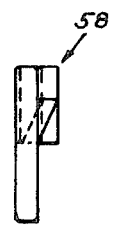
FIG. 12.

MANUAL LOCK FOR A TRAILER HITCH

BACKGROUND OF THE INVENTION

Trailer hitches, particularly of the type adapted to be knocked down and raised by a trailer tractor, have pivoted jaws which are actuated by the kingpin to cause the jaws to lock round the kingpin. It is obviously extremely important that the kingpin remain locked to the hitch if for some reason the jaws should fail to hold the kingpin. Accordingly, it is the object of the invention to provide additional kingpin locking means as a safeguard against release of the kingpin in transit.

SUMMARY OF THE INVENTION

A manual kingpin lock is added to the usual kingpin holding means of a trailer hitch which may be of the type shown in U.S. Pat. No. 3,262,402. The manual lock includes a plate pivoted at its extremely end to the supporting or mounting plate of the hitch. The locking plate in its upper position lies immediately below the kingpin and has an upstanding wall at its forward end adjacent the lower portion of the kingpin. In its lower position the locking plate, including its upstanding wall, is beneath the kingpin and permits the kingpin to slide out of engagement with the hitch. A locking handle, including a slidable bar, is mounted on the bottom of the supporting plate so that when it is moved forwardly it engages the bottom of the locking plate and moves it upwardly into its locking position. In this position the kingpin is barred from moving out of the supporting plate, and prevented from moving forwardly far enough to force the jaw open in response to a severe jolt or other occurrence in transit.

BRIEF DESCRIPTION OF THE DRAWING

The invention is disclosed in the accompanying drawing containing the following figures:

FIG. 8 is a top plan view of the locking plate.

FIG. 9 is a sectional view taken along line 9—9 of FIG. 8.

FIGS. 10, 11, and 12 are top, side, and end views of the locking handle.

DESCRIPTION OF THE PREFERRED EMBODIMENTS

Figure 1:
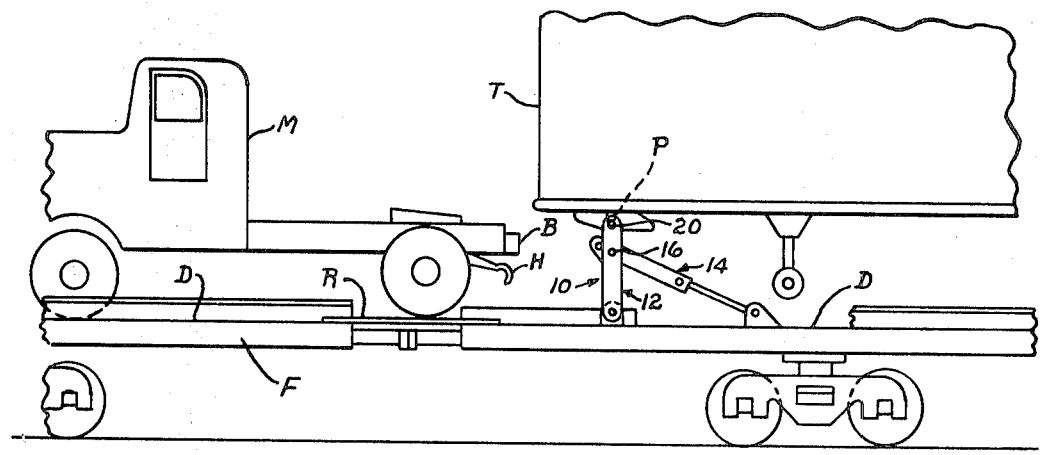
FIG. 1 is a fragmentary side elevational view of a trailer secured to a railway flat car by a trailer hitch with a tractor shown for actuating the hitch.
Figure 2:
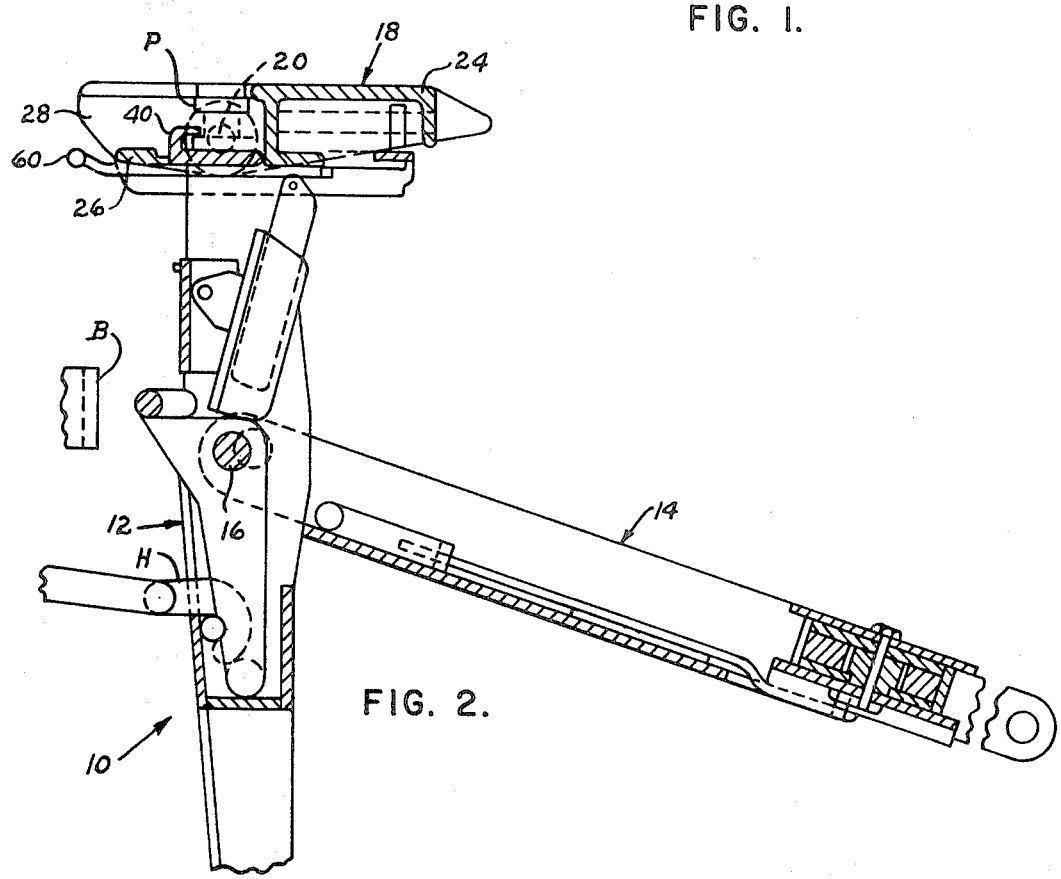
FIG. 2 is a partial side elevational view of the trailer hitch shown in FIG. 1 with certain parts broken away and illustrating the locking device of the present invention in locked position in the erected locked position of the hitch.
Figure 4:
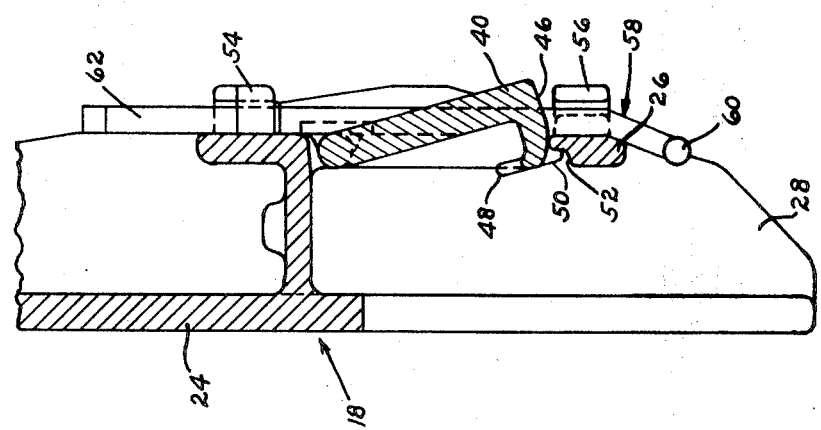
FIG. 4 is a longitudinal section of the supporting plate of the hitch with the locking device of the invention secured thereto and taken generally along line 4—4 of FIG. 3.
Figure 3:
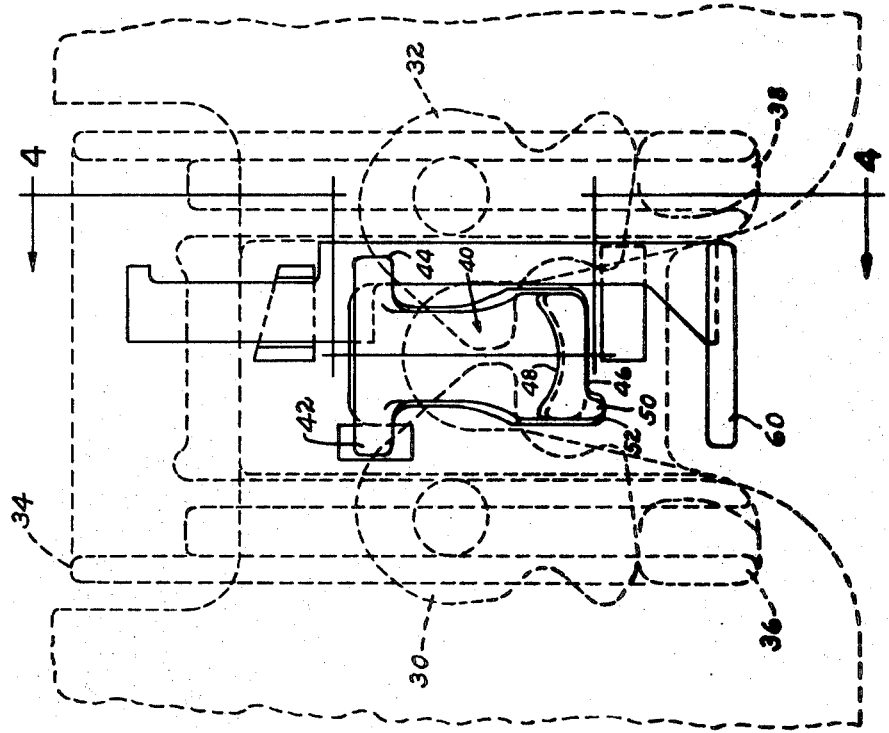
FIG. 3 is a top plan view of the locking device of the invention in its open position, with a portion of the supporting plate structure shown in phantom view.

The invention is applicable to various types of railway car trailer hitches, only one type of which is shown. Railway flat cars F are coupled to each other and their floor or deck plates D are spanned by bridge plates R. A tractor M is supported on bridge plates R when moving from one flat car to another. A trailer T is partially shown in FIG. 1 and a collapsible trailer hitch or support indicated generally at 10 is mounted on flat car F. Trailer T has a kingpin P which is engaged and locked in position to hold the associated trailer in secured position.

Hitch 10 comprises a vertical support member generally designated 12 and a diagonal support member 14 pivotally connected about horizontal pivot 16 to vertical support member 12. A supporting plate structure generally designated 18 is pivotally connected about horizontal pivot 30 to the extending end of vertical support member 12. Hitch 120 is adapted to be pulled from a collapsed position to an erect position by hook H on the rear of tractor M upon forward movement of the tractor. Bumper block B on the rear of tractor M is adapted to knock down hitch 10 to a collapsed position from erect position upon rearward movement of tractor M, and effect unlocking of the trailer kingpin P and unlocking of diagonal support member 14 to permit collapsing of hitch 10.

Figure 5:
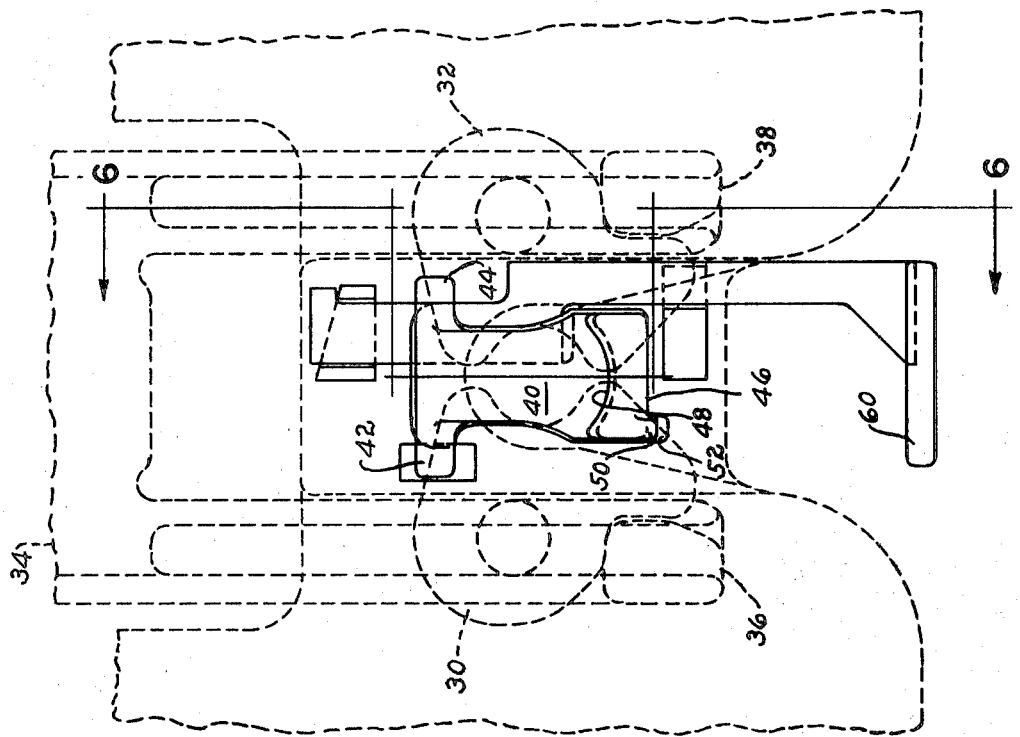
FIG. 5 is a top plan view similar to FIG. 3 of the locking device in its locking postion.
Figure 7:
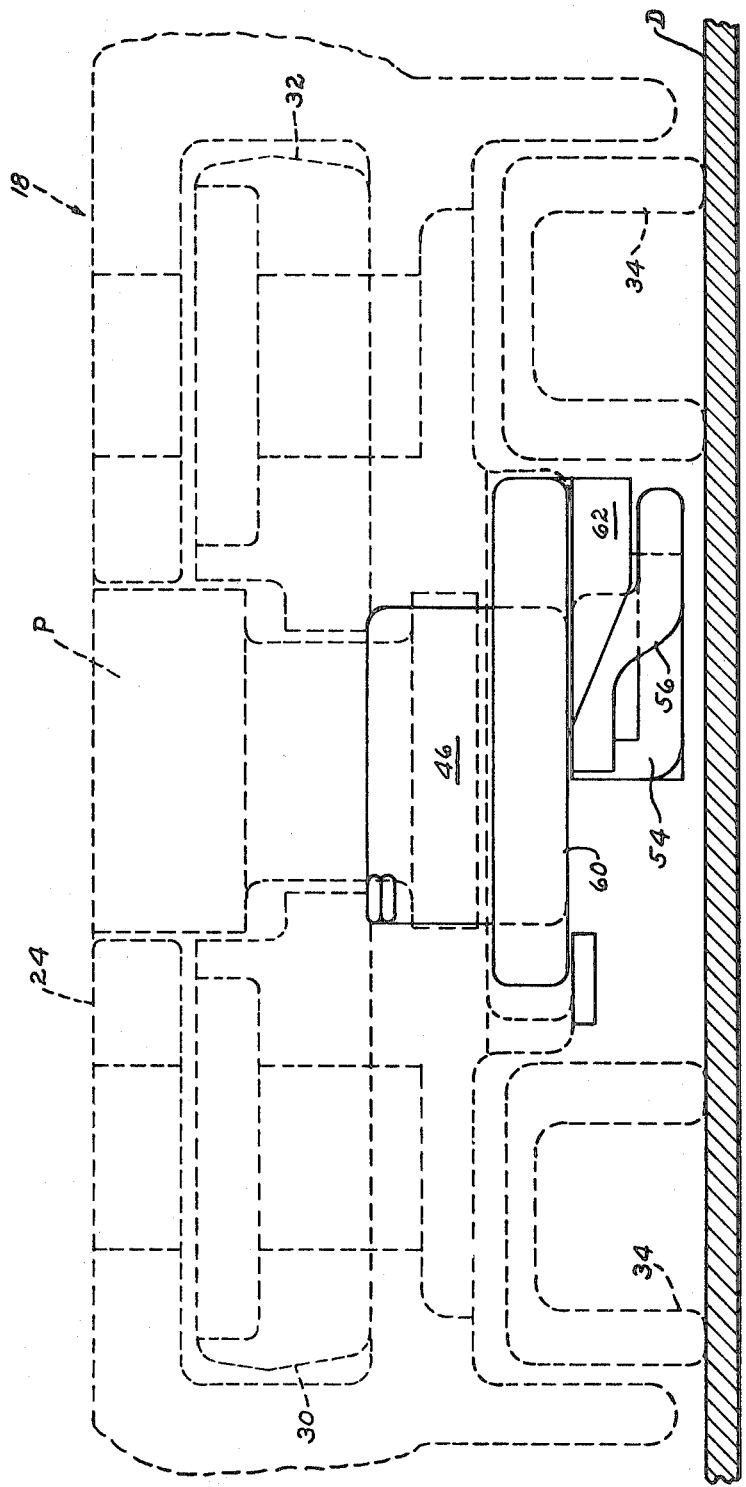
FIG. 7 is a front view of the locking device of the invention in the closed position with a portion of the supporting plate structure shown in phantom view.

Support plate 18 has an upper plate 24 and a lower plate 26. Upper plate 24 has a tapered opening 28 at its forward end through which the kingpin is received as the hitch is raised, or as the trailer T is moved rearwardly. Kingpin P strikes jaws 30, 32 which are normally held open by torsion springs and turns them to their closed positions around the kingpin, as shown in FIG. 5. Yoke 34 is then moved rearwardly until blocks 36, 38 of the yoke engage the backs of jaws 30, 32 as shown in FIG. 5. Jaws 30, 32 are then locked closed and cannot turn to their open positions. The general construction of the hitch as so far described is shown and described in U.S. Pat. No. 3,262,402 and is not part of the present invention.

Figure 6:
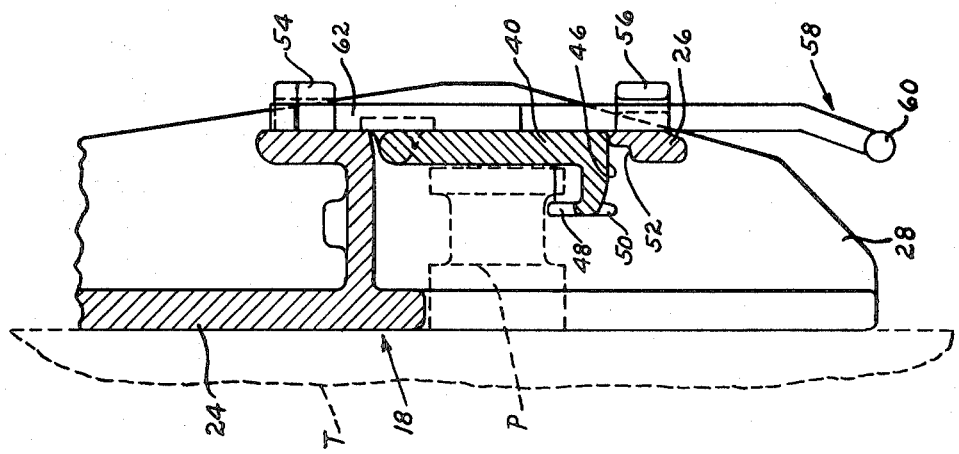
FIG. 6 is a longitudinal section of the supporting plate of the hitch with the locking device of the invention mounted therein and taken generally along line 6—6 of FIG. 5.

The manual locking device of the invention includes plate 40 having pivots 52 and 44 at its rear end extending into the lower plate portion 26. At the front end, plate 40 has an upturned portion 46. The upturned portion or wall 46 is preferably curved to conform to the king pin and is provided with inner lip 48 and a lug 50 on its outer side. Lug 50 is adapted to rest in an indentation 52 in lower plate 26. Plate 26 has a pair of loops 54 and 56 on its underside through which locking handle 58 extends. Locking handle 58 includes a handgrip 60 and a horizontal bar 62. When locking handle 58 is pulled forwardly, the edge 64 thereof engages the underside of locking plate 40 and moves it upwardly into the position shown in FIG. 6. In this position it is apparent that wall 46 of locking plate 40 will prevent the kingpin from moving out of supporting plate 18 in the event that the locking jaws 30, 32 should open for any reason.

The upturned portion 46, with lip 48, of plate 40 forms a pocket for the lowermost enlarged portion 60 of the kingpin if the kingpin begins to move forwardly. If a severe jolt occurs in transit causing the kingpin to forcibly impact wall 46 of plate 40, the forward movement of the kingpin will be limited and insufficient to cause opening of jaws 30, 32. Thus, locking plate 40 serves to prevent release of the kingpin in transit.

What is claimed is:

1. In a trailer hitch mounted on a railway car or the like and having a fifth wheel support plate for receiving a kingpin of a trailer and locking means for securing the kingpin to the fifth wheel plate, the improvement comprising an additional locking member and a locking handle for raising and lowering the locking member, said locking member having an upstanding stop at its forward end, means for pivotally mounting said locking member on said fifth wheel plate with said stop below the kingpin, said locking handle being mounted on said fifth wheel plate for sliding movement into engagement with the underside of said locking member to cam it into it locking position, with said upstanding stop immediately in front of the lower portion of the kingpin for preventing forward movement of the kingpin out of its locked position in the event of failure of said locking means.

2. Apparatus according to claim 1 in which said locking member has pivot means at the rear thereof for enabling the locking member to pivot on a horizontal transverse axis.

3. Apparatus according to claim 2 wherein said locking member includes a bottom plate and said stop is an upturned wall on said bottom plate having a curvature conforming to the kingpin.

4. Apparatus according to claim 2 wherein said locking handle slides longitudinally and has a handgrip at its forward end.

5. In a trailer hitch mounted on a railway car or the like and having a fifth wheel support for receiving a kingpin of a trailer and means for locking the kingpin to the fifth wheel plate, the improvement comprising an additional locking member located beneath the kingpin and a locking handle, said locking member having a substantially horizontal plate pivoted at the rear thereof for enabling the locking member to pivot on a horizontal transverse axis, said locking member having an upstanding wall at is forward end, said locking handle being mounted on said fifth wheel plate for sliding movement forwardly into engagement with the underside of said locking members to cam said locking member upward into its locking position, with said upstanding wall immediately in front of the lower portion of the kingpin to prevent the kingpin from moving out of its locked position in the event of failure of said locking means.

6. A trailer hitch according to claim 5 wherein said means for locking the kingpin to the fifth wheel plate includes a pair of pivoted locking jaws adapted to be closed by the kingpin to engage the upper portion of the kingpin, said upstanding wall of the locking member being adapted to extend along the lower portion of the kingpin below the portion thereof engaged by said jaws.